United States Patent
Ghosh et al.

(10) Patent No.: US 9,871,409 B2
(45) Date of Patent: Jan. 16, 2018

(54) LPS ARCHITECTURE FOR UPS SYSTEMS

(71) Applicant: SCHNEIDER ELECTRIC IT CORPORATION, West Kingston, RI (US)

(72) Inventors: Rajesh Ghosh, Bangalore (IN); Damir Klikic, Waltham, MA (US); Mahendrakumar H. Lipare, Bangalore (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 120 days.

(21) Appl. No.: 14/893,796

(22) PCT Filed: May 29, 2013

(86) PCT No.: PCT/US2013/043089
§ 371 (c)(1),
(2) Date: Nov. 24, 2015

(87) PCT Pub. No.: WO2014/193362
PCT Pub. Date: Dec. 4, 2014

(65) Prior Publication Data
US 2016/0111917 A1  Apr. 21, 2016

(51) Int. Cl.
*H02J 9/00* (2006.01)
*H02J 9/06* (2006.01)

(52) U.S. Cl.
CPC ............... *H02J 9/061* (2013.01); *H02J 9/00* (2013.01); *H02J 9/06* (2013.01); *H02J 9/062* (2013.01)

(58) Field of Classification Search
CPC ............... H02J 9/00; H02J 9/06; H02J 9/0062
See application file for complete search history.

(56) References Cited

U.S. PATENT DOCUMENTS 3,778,634 A  12/1973 Hanrihan
4,010,381 A  3/1977 Fickenscher et al.
(Continued)

FOREIGN PATENT DOCUMENTS

CN  102893492 A  1/2013
DE  43 42 327 A1  7/1994
(Continued)

OTHER PUBLICATIONS

All About Circuits, Phasing: Transformers, Dec. 27, 2011 (Dec. 27, 2011) [retrieved on Oct. 13, 2013] Retrieved from the Internet: <URL:http://web.archive.org/web/20111227123255/http://www.al-laboutcircuits.com/vol_2/chpt_9/4.html> pp. 1-3.
(Continued)

*Primary Examiner* — Robert Deberadinis
(74) *Attorney, Agent, or Firm* — Lando & Anastasi, LLP

(57) ABSTRACT

According to one aspect, embodiments herein provide a UPS comprising a transformer including a first primary winding configured to be coupled to a DC source, a second primary winding configured to be coupled to an AC source, and at least one secondary winding, control logic, and at least one output line, wherein the control logic is configured, in a first mode of operation, to enable the first primary winding to generate, based on power received from the DC source, a first output voltage at the at least one output line, and to disable the second primary winding, and wherein the control logic is configured, in a second mode of operation, to enable the second primary winding to generate, based on power received from the AC source, a second output voltage at the at least one output line, and to disable the first primary winding.

20 Claims, 4 Drawing Sheets

(56) References Cited

U.S. PATENT DOCUMENTS

| | | |
|---|---|---|
| 4,564,767 A | 1/1986 | Charych |
| 4,713,553 A | 12/1987 | Townsend et al. |
| 4,916,329 A | 4/1990 | Dang et al. |
| 5,029,285 A | 7/1991 | Bobry |
| 5,315,533 A | 5/1994 | Stich et al. |
| 5,602,462 A | 2/1997 | Stich et al. |
| 5,760,495 A | 6/1998 | Mekanik |
| 5,781,422 A | 7/1998 | Lavin et al. |
| 5,982,652 A | 11/1999 | Simonelli et al. |
| 7,259,476 B2 | 8/2007 | Frey |
| 7,446,433 B2 | 11/2008 | Masciarelli et al. |
| 7,939,968 B2 | 5/2011 | Hjort et al. |
| 8,203,235 B2 | 6/2012 | Fox et al. |
| 8,896,152 B2 | 11/2014 | Beg et al. |
| 2002/0140403 A1 | 10/2002 | Reddy |
| 2004/0036449 A1 | 2/2004 | Bean et al. |
| 2004/0223347 A1 | 11/2004 | Kobayashi et al. |
| 2005/0168073 A1 | 8/2005 | Hjort |
| 2006/0043797 A1 | 3/2006 | Hjort et al. |
| 2010/0045107 A1 | 2/2010 | Cohen et al. |
| 2010/0201194 A1 | 8/2010 | Masciarelli et al. |
| 2012/0217809 A1 | 8/2012 | Sato et al. |
| 2014/0150186 A1 | 6/2014 | Metten et al. |
| 2016/0111917 A1 | 4/2016 | Ghosh et al. |

FOREIGN PATENT DOCUMENTS

| | | |
|---|---|---|
| KR | 10-2010-0131342 | 12/2010 |
| NL | 7604353 A | 10/1976 |
| WO | 9205614 A1 | 4/1992 |
| WO | 2009126405 A2 | 10/2009 |
| WO | 2010/070676 A2 | 6/2010 |
| WO | 2013023855 A2 | 2/2013 |
| WO | 20140193362 A1 | 12/2014 |

OTHER PUBLICATIONS

Notification of Transmital of the International Search Report and the Written Opinion of the International Searching Authority from corresponding PCT/US2013/043089 dated Oct. 31, 2013.

Van Roo, Transistor Tutorial, Part 10: Metal Oxide Semiconductor Field Effect Transistors, 2005 [retrieved on Oct. 13, 2013] Retrieved from the Internet: <URL:http://www.sentex.ca/-mec1995/tutorial/xtor/xtor10/xtor10.html>, pp. 1-8.

Extended European Search Report from corresponding European Application No. 13885871.7 dated Oct. 4, 2016.

LPS ARCHITECTURE FOR UPS SYSTEMS

CROSS-REFERENCE TO RELATED APPLICATIONS

This application is a U.S. National Stage Application under 35 U.S.C. §371 of International Application No. PCT/US2013/043089, filed May 29, 2013, titled LPS ARCHITECTURE FOR UPS SYSTEMS, which is hereby incorporated herein by reference in its entirety.

BACKGROUND OF INVENTION

1. Field of Invention

At least some embodiments described herein relate generally to Logic Power Supply (LPS) systems within Uninterruptible Power Supplies (UPS).

2. Discussion of Related Art

Logic Power Supply (LPS) systems typically provide required bias power to different subsystems (e.g., a Digital Signal Processor (DSP), microcontroller, control and communication systems, gate driver, etc) of an Uninterruptible Power Supply (UPS).

SUMMARY OF INVENTION

At least one aspect of the invention is directed to an Uninterruptible Power Supply (UPS) system, the UPS comprising a transformer including a first primary winding configured to be coupled to a DC power source, a second primary winding configured to be coupled to an AC power source, and at least one secondary winding, control logic coupled to the first primary winding and the second primary winding, and at least one output line coupled to the at least one secondary winding, wherein the control logic is configured, in a first mode of operation, to enable the first primary winding to generate, based on power received from the DC power source, a first output voltage at the at least one output line, and to disable the second primary winding, and wherein the control logic is configured, in a second mode of operation, to enable the second primary winding to generate, based on power received from the AC power source, a second output voltage at the at least one output line, and to disable the first primary winding.

According to one embodiment, the UPS system further comprises a DC-DC controller coupled to the first primary winding, and an AC-DC controller coupled to the second primary winding, wherein, in the first mode of operation, the DC-DC controller is configured to selectively control current from the DC power source through the first primary winding to induce a first current in the at least one secondary winding, the first current in the at least one secondary winding generating the first output voltage on the at least one output line, and wherein, in the second mode of operation, the AC-DC controller is configured to selectively control current from the AC power source through the second primary winding to induce a second current in the at least one secondary winding, the second current in the at least one secondary winding generating the second output voltage on the at least one output line.

According to another embodiment, the DC-DC controller comprises a switch coupled to the first primary winding and configured to selectively control the current from the DC power source through the first primary winding. In one embodiment, the AC-DC controller comprises a switch coupled to the second primary winding and configured to selectively control the current from the AC power source through the second primary winding.

According to one embodiment, the at least one secondary winding of the transformer has a polarity opposite that of the first and second primary windings. In another embodiment, the DC-DC controller is coupled to the at least one output line via a feedback line, and wherein the DC-DC controller is further configured to selectively control current from the DC power source through the first primary winding based on the first output voltage on the at least one output line. In one embodiment, the AC-DC controller is coupled to the at least one output line via a feedback line, and wherein the AC-DC controller is further configured to selectively control current from the AC power source through the second primary winding based on the second output voltage on the at least one output line.

According to another embodiment, the UPS system further comprises a bus configured to be coupled between the DC power source and the first primary winding and to the control logic, wherein the control logic is further configured to monitor a DC voltage on the bus provided by the DC power source and, in response to a determination that the DC voltage on the bus is at least at a threshold level, to drive the UPS system into the first mode of operation. In one embodiment, in response to a determination that the DC voltage on the bus is not at least at a threshold level, the control logic is further configured to drive the UPS system into the second mode of operation.

According to one embodiment, in the second mode of operation, the AC-DC controller is further configured to monitor AC power provided by the AC power source and, in response to a determination that the AC power is acceptable, to selectively control the current from the AC power source through the second primary winding.

According to another embodiment, the UPS system further comprises a switch configured to selectively couple the bus to the DC power source, and a selection logic module coupled to the at least one output line, the switch and the bus, wherein the selection logic module is configured to operate the switch to couple the bus to the DC power source in response to receiving the second output voltage on the at least one output line in the second mode of operation. In one embodiment, the UPS system further comprises a push button coupled to the selection logic module, wherein the selection logic module is configured to operate the switch to couple the bus to the DC power source in response to a user pressing the push button.

According to one embodiment, the DC-DC controller is electrically isolated from the AC-DC controller. In another embodiment, the AC power source is an AC mains supply coupled to an Uninterruptible Power Supply (UPS), and wherein the DC power source is at least one of a battery and a battery charger within the UPS.

Another aspect of the invention is directed to a method for providing DC power with an UPS system comprising a transformer including a first primary winding configured to be coupled to a DC power source, a second primary winding configured to be coupled to an AC power source, and at least one secondary winding coupled to an output line, the method comprising monitoring, with control logic coupled to the DC power source, voltage provided by the DC power source to the first primary winding, comparing, in response to monitoring, the voltage provided by the DC power source to a reference voltage, determining, in response to comparing, whether a level of the voltage provided by the DC power source is at least equal to the reference voltage, in response to determining that the level of the voltage provided by the DC power source is at least equal to the reference voltage, transmitting a signal to a first controller coupled to the first primary winding to enable the first controller, and transmitting a signal to a second controller coupled to the second primary winding to disable the second controller, and operating, in response to enabling the first controller, the first controller to control current from the DC power source through the first primary winding to induce a first current in the at least one secondary winding, the first current in the at least one secondary winding generating a first output voltage on the output line.

According to one embodiment, the method further comprises in response to determining that the level of the voltage provided by the DC power source is not at least equal to the reference voltage, transmitting a signal to the first controller coupled to the first primary winding to disable the first controller, and transmitting a signal to the second controller coupled to the second primary winding to enable the second controller, in response to enabling the second controller, monitoring, with the second controller, AC power provided by the AC power source, determining, in response to monitoring, whether the AC power provided by the AC power source is acceptable, and operating, in response to determining that the AC power provided by the AC power source is acceptable, the second controller to control current from the AC power source through the second primary winding to induce a second current in the at least one secondary winding, the second current in the at least one secondary winding generating a second output voltage on the output line. In one embodiment the method further comprises delaying the signal transmitted to the second controller to enable the second controller.

According to one embodiment, the UPS system further comprises a switch configured to selectively couple the first primary winding to the DC power source, and the method further comprises closing, in response to receiving the second output voltage from the output line, the switch to couple the first primary winding to the DC power source. In another embodiment, the method further comprises monitoring, with the second controller, AC power provided by the AC power source, determining, in response to monitoring, whether the AC power provided by the AC power source is acceptable, and operating, in response to determining that the AC power provided by the AC power source is acceptable, the second controller to control current from the AC power source through the second primary winding to induce a second current in the at least one secondary winding, the second current in the at least one secondary winding generating a second output voltage on the output line.

At least one aspect of the invention is directed to an Uninterruptible Power Supply (UPS), the UPS comprising an input configured to be coupled to an AC mains supply, a converter coupled to the input, an inverter coupled to the converter with a DC bus, a DC power source coupled to the DC bus, a transformer coupled to the AC mains supply and the DC power source, and means for selecting one of the AC mains supply and the DC power source at a time to provide power to the transformer and for generating a plurality of desired DC voltages with the transformer based on the power received from the selected one of the AC mains supply and the DC power source.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
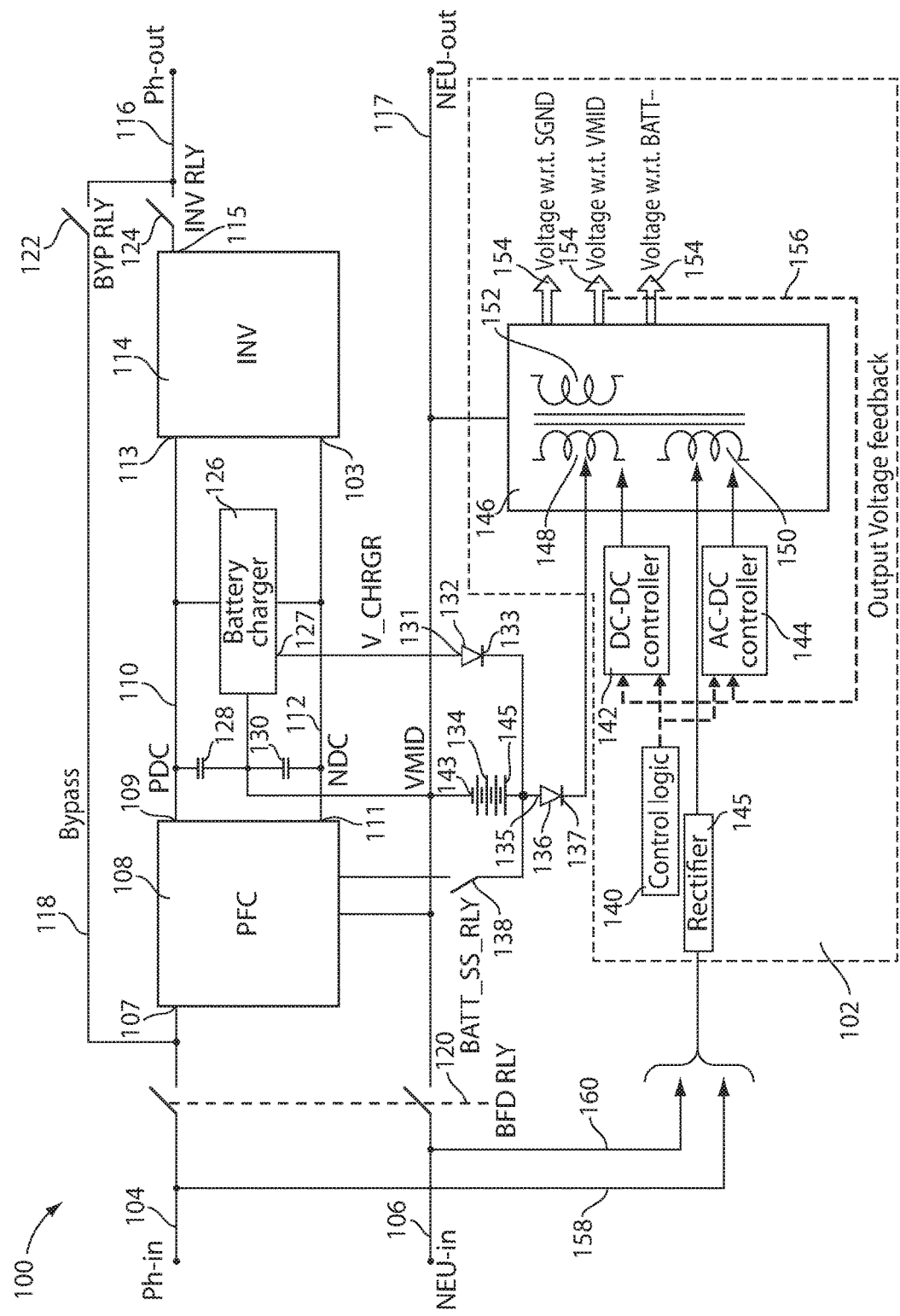
FIG. 1 illustrates a UPS and LPS system according to aspects of the current invention.

Various embodiments and aspects thereof will now be discussed in detail with reference to the accompanying drawings. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, LPS systems typically provide required bias power to different subsystems (e.g., a DSP processor, microcontroller, control and communication systems, gate driver, etc) of an Uninterruptible Power Supply (UPS). Common LPS systems utilize a full capacity converter (including a transformer) to provide the required LPS bias power. The full capacity converter typically receives DC power from either a battery charger within the UPS or from another full capacity converter (including another transformer) which is coupled to AC mains. The use of two full capacity converters (including two separate transformers) in a UPS is costly, inefficient, and/or overly complex.

Accordingly, embodiments described herein provide a single-transformer based system and control scheme in a UPS that is more efficient, smaller, and less costly than traditional systems.

FIG. 1 illustrates a UPS 100 including an LPS system 102 according to at least one embodiment described herein. The UPS 100 includes an input line 104, an input neutral line 106, a Power Factor Correction (PFC) converter 108, a battery charger 126, an inverter 114, a bypass line 118, an output line 116, a neutral output line 117, and the LPS system 102. The LPS system 102 includes control logic 140, a rectifier 145, a DC-DC controller 142, an AC-DC controller 144, a transformer 146, and multiple output lines 154. The transformer 146 includes a first primary winding 148, a second primary winding 150 and at least one secondary winding 152.

The input line 104 of the UPS 100 is coupled to the input 107 of the PFC converter 108 via a backfeed relay 120. A first output 109 of the PFC converter 108 is coupled to a first input 113 of the inverter 114 via a positive DC bus. A second output 111 of the PFC converter 108 is coupled to a second input 103 of the inverter 114 via a negative DC bus 112. The output 115 of the inverter 114 is coupled to the output line 116 of the UPS 100 via an inverter relay 124. The bypass line 118 is coupled between the input 107 of the PFC converter 108 and the output line 116 of the UPS 100 via a bypass relay 122. The neutral input line 106 is coupled to the neutral output line 117 via the backfeed relay 120.

The battery charger 126 is coupled between the positive DC bus 110 and the negative DC bus 112. The battery charger 126 is also coupled to the neutral output line 117. A first capacitor 128 is coupled between the positive DC bus 110 and the neutral output line 117. A second capacitor 130 is coupled between the negative DC bus 112 and the neutral output line 117. An output 127 of the battery charger 126 is coupled to the anode 131 of a first diode 132. The cathode 133 of the first diode is coupled to the positive side 145 of a battery 134. The negative side 143 of the battery 134 is coupled to the neutral output line 117. The positive side 145 of the battery 134 is coupled to the PFC converter 108 via a battery relay 138. The positive side 145 of the battery 134 is also coupled to the anode 135 of a second diode 136.

The cathode 137 of the second diode 136 is coupled to the first primary winding 148 of the LPS system 102. The DC-DC controller 142 is also coupled to the first primary winding 148 of the LPS system 102. The AC-DC controller 144 is coupled to the second primary winding 150 of the LPS system 102. The input line 104 and the neutral input line 106 of the UPS 100 are both also coupled through the rectifier 145 to the second primary winding 150 of the LPS system 102 via the LPS input line 158, the LPS neutral input line 160 and the rectifier 145. Both the DC-DC controller 142 and the AC-DC controller 142 of the LPS system 102 are coupled to the output lines 154 of the LPS system 102 via an output voltage feedback line 156 and to the control logic 140.

The input line 104 and the neutral input line 106 of the UPS 100 are coupled to AC mains and receive AC power from AC mains. Based on the AC power received from AC mains, the UPS 100 is configured to operate in different modes of operation.

In response to a determination that the AC power received from AC mains is at a desired level, the UPS 100 enters a "bypass" mode of operation. In the "bypass" mode of operation, the backfeed relay 120 and the bypass relay 122 are closed (the inverter relay 124 is open) and the input line 104 of the UPS 100 (coupled to AC mains) is coupled directly to the output line 116 of the UPS 100 via the bypass line 118. In the "bypass" mode of operation, AC power received at the input 102 from AC mains is provided directly to the output 112.

In response to a determination that the AC power received from AC mains is either lower than or greater than the desired level (e.g., is in a sag or swell condition), the UPS 100 enters a "normal" mode of operation. In the "normal" mode of operation, the backfeed relay 120 and the inverter relay 124 are closed (the bypass relay 122 is open) and the PFC converter 108 receives AC power from AC mains at its input 107. The PFC converter 108 converts the AC power into DC power, and provides positive DC power to the positive DC bus 110 via its first output 109 and provides negative DC power to the negative DC bus 112 via its second output 111. DC power on the positive 110 and negative 112 busses is provided to the inputs 103, 113 of the inverter 114. The inverter 114 converts the received DC power into desired AC power and the desired AC power is provided to the output line 116 of the UPS 100 from the output 115 of the inverter.

Also in the "normal" mode of operation, DC power on the positive 110 and negative 112 DC busses is provided to the battery charger 126. The battery charger 126 converts the DC power received from the DC busses 110, 112 into DC power at a desired level. The DC power from the battery charger 126 is provided to the positive side 145 of the battery 134, via the first diode 132, to charge the battery 134.

In response to a determination that the AC power received from AC mains has failed (e.g., is in a brownout or blackout condition), the UPS 100 enters a "battery" mode of operation. In the "battery" mode of operation, the backfeed relay 120 is opened and the battery relay 138 is closed. DC power from the battery 134 is provided to the PFC 108 via the battery relay 138 as the battery 134 discharges. The PFC converter 108 converts the DC power received from the battery 134 into DC power at a desired level and provides the desired DC power to the positive 110 and negative 112 DC buses. DC power on the positive 110 and negative 112 busses is provided to the inputs 103, 113 of the inverter 114. The inverter 114 converts the received DC power into desired AC power, and the desired AC power is provided to the output line 116 of the UPS 100 from the output 115 of the inverter.

The LPS system 102 is configured to receive power from one of two power sources within the UPS 100. According to one embodiment, the LPS system 102 is configured to receive power from either AC mains (e.g., via the LPS input line 158 and the LPS neutral input line 160) or from a DC source (i.e., the DC battery 134/battery charger 126), depending on the status or operational state of the UPS 100. For example, according to one embodiment, if a determination is made that adequate voltage is available from the battery 134/battery charger 126, then the DC-DC controller 142 of the LPS system 102 drives the first primary winding 148 of the transformer 146 using power from the battery 134 or battery charger 126 via the second diode 136. Current is induced in each one of the secondary windings 152 to generate a desired voltage which is output from the LPS system 102 on one of the multiple output lines 154. Each output line 154 may be configured to provide a desired supply voltage (e.g., 12V, 24V, etc) to a subsystem within the UPS 100 (e.g., such as a DSP processor, microcontroller, control and communication systems, gate driver, etc.).

If a determination is made that adequate voltage is not available from the battery 134 or battery charger 126, then the AC-DC controller 144 of the LPS system 102 drives the second primary winding 150 of the transformer 146 using AC mains power from the LPS input line 158 and the LPS neutral input line 160 via the rectifier 145. Current is induced in each one of the secondary windings 152 to generate the desired voltages at the multiple output lines 154.

According to one embodiment, each primary winding 148, 150 is individually controlled by its own associated controller 142, 144 based on the status of the UPS 100. Each controller 142, 144 also monitors the output of the LPS system 102 by receiving a voltage feedback signal from an output line 154 of the LPS system 102 via the output voltage feedback line 156. Although shown as one feedback line 156, a separate feedback line may be used for each voltage feedback signal. According to one embodiment, the control logic 140 operates the LPS system 102 and only enables one of the controllers 142, 144 at a time, based on the status of the UPS 100. Operation of the LPS system 102 is discussed in greater detail below.

Figure 2:
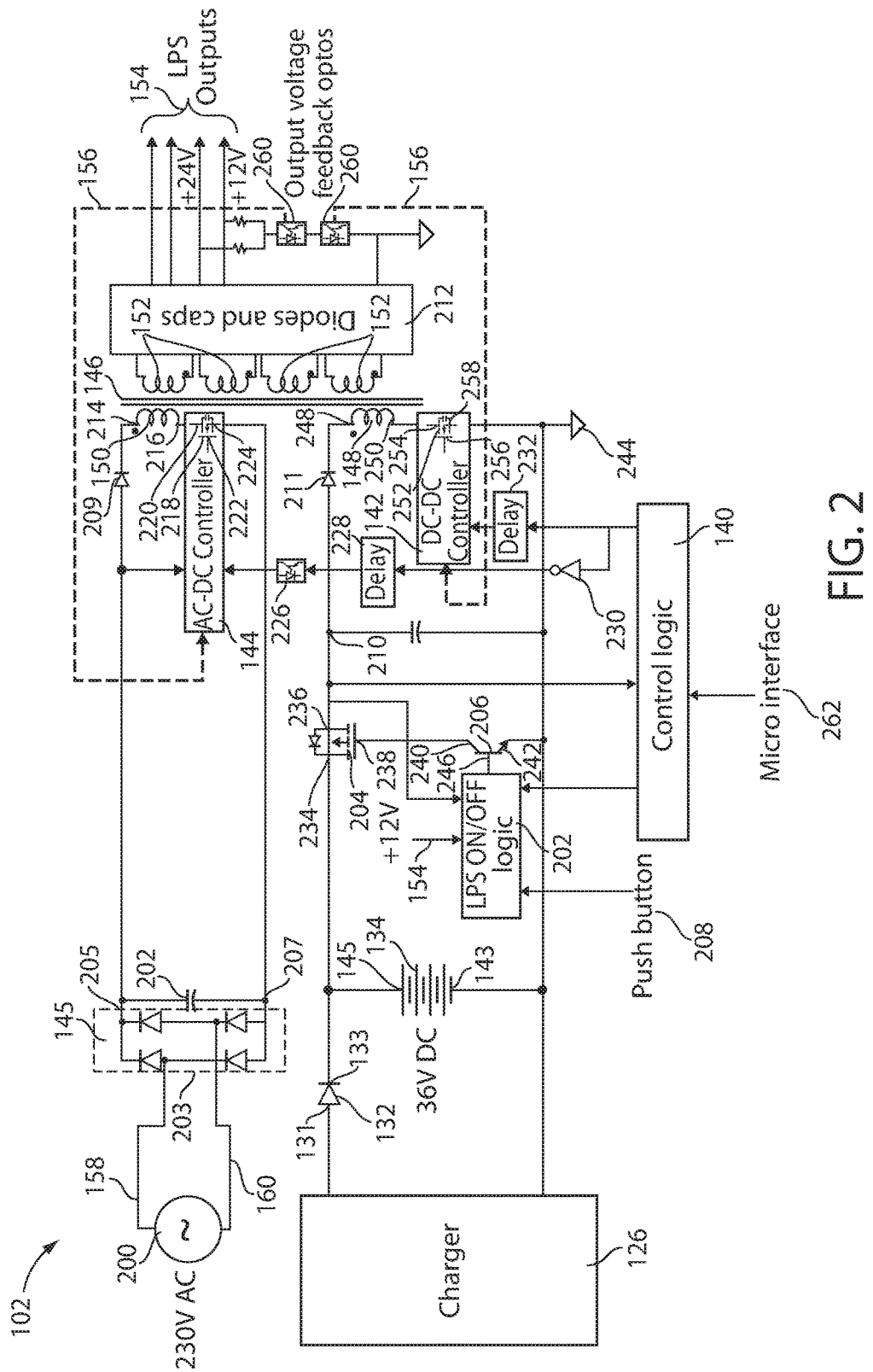
FIG. 2 illustrates an LPS system according to aspects of the current invention.

FIG. 2 illustrates the LPS system 102 according to at least one embodiment described herein. The LPS system 102 includes the rectifier 145, a capacitive filter 202, the AC-DC controller 144, the DC-DC controller 142, the transformer 146, the control logic 140, an LPS ON/OFF switching logic module 202, a Field Effect Transistor (FET) 204, a transistor 206, a push button 208, a Low Voltage (LV) bus 210, a diode and capacitor circuit 212, the multiple output lines 154, and the output voltage feedback lines 156. The transformer 146 includes the first primary winding 148, the second primary winding 150, and multiple secondary windings 152. According to one embodiment, the transformer 146 is a flyback transformer in which the polarity of the primary windings 148, 150 is opposite that of the polarity of the secondary windings 152; however, in other embodiments, a different type of transformer may be utilized.

The input 203 of the rectifier 145 is configured to be coupled to AC mains 200 via the LPS input line 158 and the LPS neutral input line 160. According to one embodiment, the rectifier 145 is a full bridge rectifier; however, in other embodiments, a different type of rectifier may be utilized. The capacitive filter 202 is coupled in parallel with the rectifier 145, between the output DC line 205 of the rectifier 145 and a DC line 207. The output of the rectifier 205 is coupled to a first end 214 of the second primary winding 150 of the transformer 146 via a diode 209. A second end 216 of the second primary winding 150 of the transformer 146 is coupled to the AC-DC controller 144.

According to one embodiment, the AC-DC controller 144 is a Pulse Width Modulation (PWM) flyback controller including a switch 218 that selectively couples the second end 216 of the second primary winding 150 of the transformer 146 to the DC line 207, allowing current through the second primary winding 150 when the switch 218 is closed. For example, according to one embodiment, the switch 218 is a FET having a drain 220 coupled to the second end 216 of the second primary winding 150, a source 224 coupled to the DC line 207, and a gate 222. However, in other embodiments, another type of switch 218 may be utilized to control the current through the second primary winding 150.

According to one embodiment, the flyback controller 144 is a TOPSwitch based flyback controller manufactured by Power Integrations of San Jose, Calif.; however, in other embodiments, another type of flyback controller may be utilized. According to one embodiment, the flyback controller 144 includes flyback control circuitry as described in International Patent Application Number PCT/US13/23855 entitled "FLYBACK CONVERTER," filed on Jan. 30, 2013, which is herein incorporated by reference in its entirety. As described herein, the controller 144 is a flyback controller; however, in other embodiments, a different type of controller may be utilized to control current through the second primary winding 150.

According to one embodiment, the AC-DC controller 144 is also coupled to the output 205 of the rectifier 145. According to another embodiment, the AC-DC controller 144 is coupled to control logic 140 via an inverter gate 230, a delay circuit 228, and an optocoupler 226. The AC-DC controller 144 is also coupled to one of the output lines 154 of the LPS system 102 with an output voltage feedback line 156 via an output voltage feedback optocoupler 260.

The source 234 of the FET 204 is coupled to the battery charger 126 of the UPS 100 via the diode 132. The source 234 of the FET 204 is also coupled to the positive side 145 of the battery 134. The gate 238 of the FET 204 is coupled to the collector 240 of the transistor 206. The emitter 242 of the transistor 206 is coupled to ground 244. The base 246 of the transistor 206 is coupled to the LPS ON/OFF switching logic module 202. The ON/OFF switching logic module 202 is coupled to the push button 208, the control logic 140, the LV bus 210, and to one of the output lines 154. The drain 236 of the FET 204 is coupled to the LV bus 210. The LV bus 210 is coupled to a first end 248 of the first primary winding 148 of the transformer 146 via a diode 211. A second end 250 of the first primary winding 148 is coupled to the DC-DC controller 142.

According to one embodiment, the DC-DC controller 142 is a Pulse Width Modulation (PWM) flyback controller including a switch 252 that selectively couples the second end 250 of the first primary winding 148 of the transformer 146 to ground 244, allowing current through the first primary winding 148 when the switch 252 is closed. For example, according to one embodiment, the switch 252 is a FET having a drain 254 coupled to the second end 250 of the first primary winding 148, a source 258 coupled to ground 244, and a gate 256. However, in other embodiments, another type of switch 252 may be utilized to control the current through the first primary winding 148.

According to one embodiment, the DC-DC controller 142 is a UC2842 or UC3845 based controller manufactured by Texas Instruments of Dallas, Tex.; however, in other embodiments, another type of controller may be utilized. According to one embodiment, the flyback controller 142 includes flyback control circuitry as described in International Patent Application Number PCT/US13/23855 referenced above. As described herein, the DC-DC controller 142 is a flyback controller; however, in other embodiments, a different type of controller may be utilized to control the current through the first primary winding 148.

According to one embodiment, the DC-DC controller 142 is also coupled to control logic 140 via a delay circuit 232. The DC-DC controller 142 is also coupled to one of the output lines 154 of the LPS system 102 with an output voltage feedback line 156 via an output voltage feedback optocoupler 260.

Each one of the secondary windings 152 of the transformer 146 is coupled to one of the output lines 154 of the LPS system 102 via a diode and capacitor circuit 212. Each output line 154 is configured to be coupled to a subsystem within the UPS 100 (e.g., such as a DSP processor, microcontroller, control and communication systems, gate driver, etc.) and to provide supply power to the subsystem.

According to one embodiment, the control logic includes a voltage comparator. According to one embodiment, the voltage comparator is a LM393 based comparator manufactured by Texas Instruments of Dallas, Tex.; however, in other embodiments, another type of voltage comparator may be utilized. As described above, the battery charger 126 or battery 134 may provide DC power to the first primary winding 148 of the transformer. Through the use of the voltage comparator, the control logic compares the voltage on the LV bus 210 (i.e., voltage provided by the battery 134 or battery charger 126 to the first primary winding 148 via the FET 204) with a reference threshold voltage. As long as the voltage on the LV bus 210 is healthy (i.e., the voltage on the LV bus 210 is at least at the level of the reference voltage), the control logic 140 enables the DC-DC controller 142 and disables the AC-DC controller.

Upon being enabled, the DC-DC flyback controller 142 operates the FET 252 to control the current through the first primary winding 148. The controller 142 controls current through the FET 252 (and hence also through the first primary winding 148) by sending controls signals to the gate 256. When the flyback controller 142 turns on the FET 252 (i.e., closes the switch 252), current from the LV bus 210 passes through the first primary winding 148 to ground 244 and resulting energy is stored in the transformer 146. Due to the reverse polarity of the secondary windings 152, the current through the first primary winding 148 while the FET 252 is on generates a negative voltage on the secondary windings 152. Due to the negative voltages on the secondary windings, diodes within the diode and capacitor circuit 212 are reverse-biased, preventing current in the secondary windings.

When the controller 142 turns off the FET 252 (i.e., opens the switch 252), current from the LV bus 120 through the first primary winding 148 to ground 244 stops. The diodes within the diode and capacitor circuit 152 that were previously reverse-biased are forward-biased and energy previously stored in the transformer 146 is discharged through the secondary windings 152. The resulting current in each secondary winding 152 generates a voltage (e.g., 12V, 24V, etc.) on an associated output line 154.

According to one embodiment, the controller 142 monitors the voltage on at least one of the output lines 154 of the LPS system 102 (via the output voltage feedback line 156) and drives the FET 252 (i.e., turns the FET 252 on and off), based on the monitored output voltage, to generate desired voltages at the output lines 154 of the LPS system 102. Each output line 154 is configured to be coupled to a subsystem within the UPS 100 (e.g., such as a DSP processor, microcontroller, control and communication systems, gate driver, etc.) and to provide supply power to the subsystem.

If the control logic 140 determines that the voltage on the LV bus 210 is not healthy (i.e., the voltage on the LV bus from the battery charger 126 or battery 134 is not at least at the level of the reference voltage), the control logic 140 enables the AC-DC controller 144 and disables the DC-DC controller 142.

Upon being enabled, the AC-DC flyback controller 144 operates the FET 218 to control the current through the second primary winding 150. The controller 144 controls current through the FET 218 (and hence also through the second primary winding 150) by sending controls signals to the gate 222. When the flyback controller 144 turns on the FET 218 (i.e., closes the switch 218), rectified AC mains current passes through the second primary winding 150 to the DC line 207 and resulting energy is stored in the transformer 146. Due to the reverse polarity of the secondary windings 152, the current through the second primary winding 150 while the FET 218 is on generates a negative voltage on the secondary windings 152. Due to the negative voltages on the secondary windings, diodes within the diode and capacitor circuit 212 are reverse-biased, preventing current in the secondary windings.

When the controller 144 turns off the FET 218 (i.e., opens the switch 218), rectified AC mains current through the second primary winding 150 to the DC line 207 stops. The diodes within the diode and capacitor circuit 152 that were previously reverse-biased are forward-biased and energy previously stored in the transformer 146 is discharged through the secondary windings 152. The resulting current in each secondary winding 152 generates a voltage (e.g., 12V, 24V, etc.) on an associated output line 154.

According to one embodiment, the controller 144 monitors the voltage on at least one of the output lines 154 of the LPS system 102 (via the output voltage feedback line 156) and drives the FET 218 (i.e., turns the FET 218 on and off), based on the monitored output voltage, to generate desired voltages at the output lines 154 of the LPS system 102. Each output line 154 is configured to be coupled to a subsystem within the UPS 100 (e.g., such as a DSP processor, microcontroller, control and communication systems, gate driver, etc.) and to supply power to the subsystem.

As described above, each primary winding 148, 150 is individually controlled by its associated controller 142, 144 based on the status of the UPS 100 and the output of the LPS system 102. According to one embodiment, the control logic 140 operates the LPS system 102 to only enable one of the controllers 142, 144 (i.e., one of the primary windings 148, 150) at a time, based on the status of the UPS 100.

Figure 3:
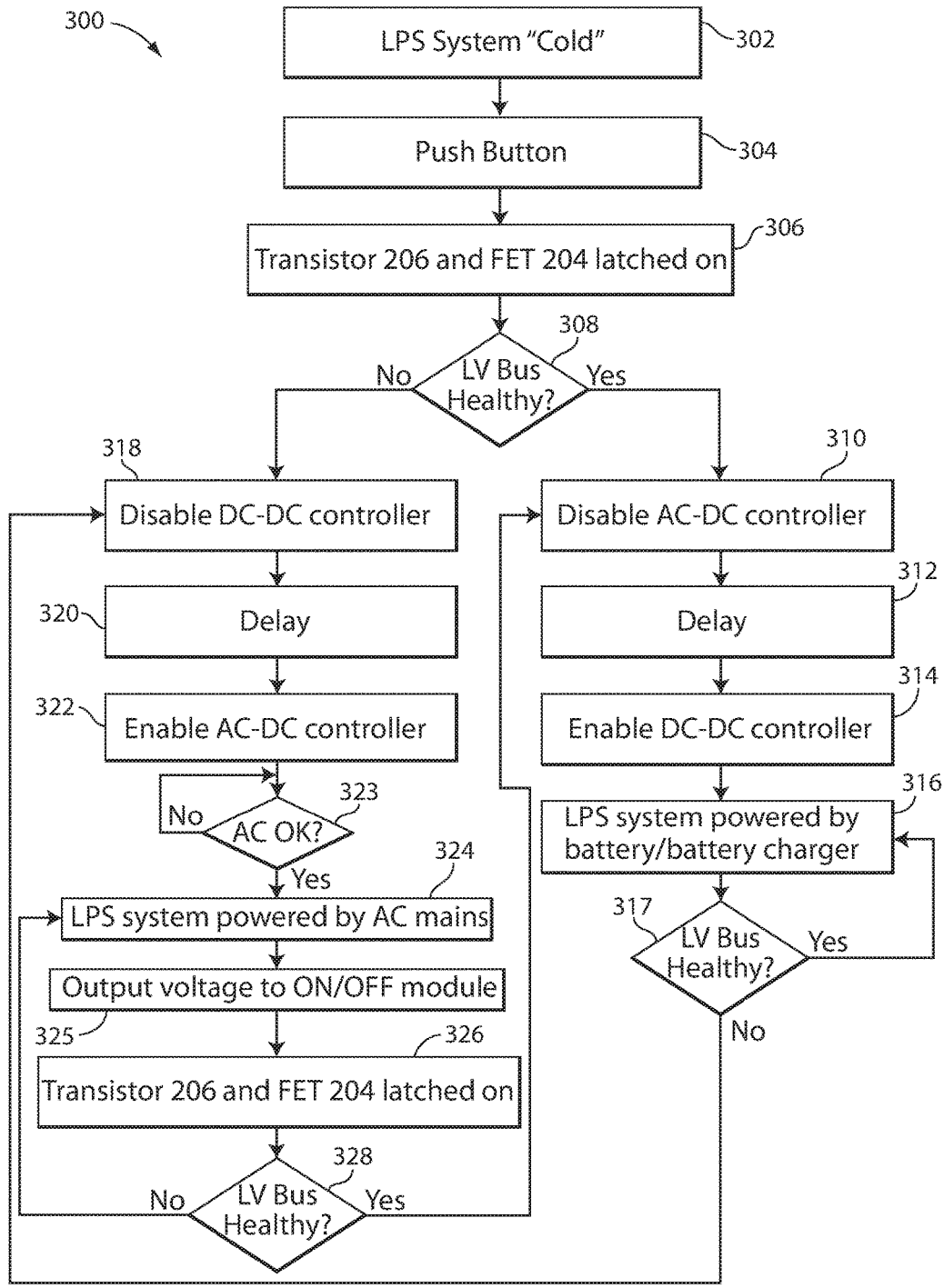
FIG. 3 is a flow chart illustrating a cold boot process for operating an LPS system according to aspects of the current invention.
Figure 4:
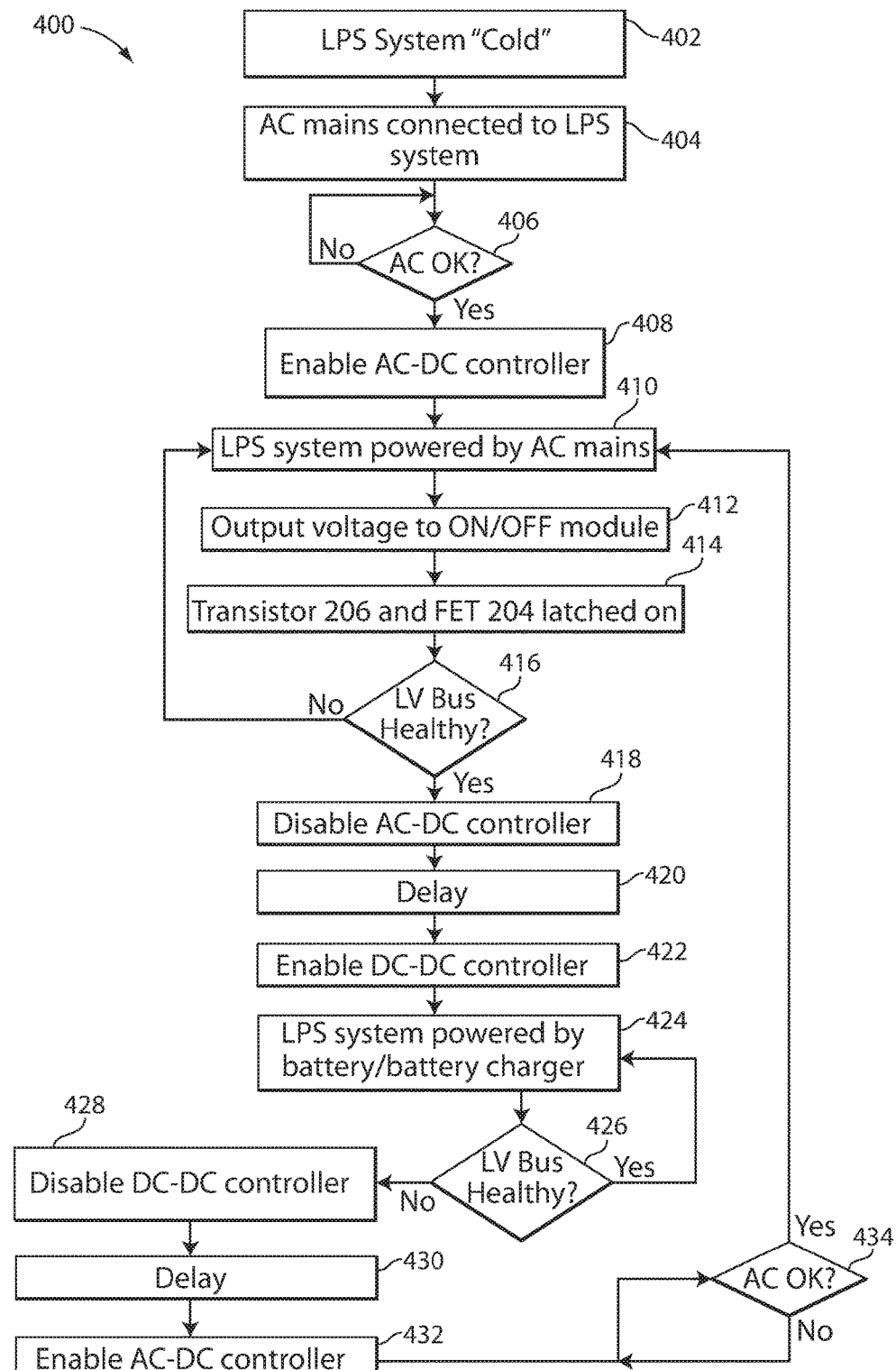
FIG. 4 is a flow chart illustrating an AC wakeup process for operating an LPS system according to aspects of the current invention.

Operation of the LPS system 102 is discussed in greater detail below with regards to FIGS. 3-4. FIG. 3 is a flow chart 300 illustrating a "cold boot" process for operation of the LPS system 102. At block 302, the LPS system 102 is "cold" (i.e., unpowered). According to one embodiment, a user may boot up the LPS system 102 by pressing the push button 208. For example, at block 304, a user of the UPS 100 presses the bush button 208 coupled to the LPS ON/OFF switching logic module 202. At block 306, in response to the push button 208 being pressed, the LPS ON/OFF switching logic module 202 latches on the transistor 206 and, as a result, also latches on the FET 204. Once the FET 204 is turned on, any available power from the battery charger 126 and/or battery 134 may be provided to the LV bus 210 via the FET 204. According to one embodiment, voltage on the LV bus 210, generated by the battery charger 126 or battery 134, is provided directly to the LPS ON/OFF switching logic module 202 to maintain the transistor 206 and FET 204 in an "on" or latched state. As described herein, a FET 204 is utilized to selectively couple the battery 134/battery charger 126 to the first primary winding 148; however, in other embodiments, any other appropriate type of switch may be utilized.

At block 308, the control logic 140 determines if the voltage on the LV bus 210, generated by the battery charger 126/battery 134 via the FET 204, is healthy. As described above, the control logic 140 utilizes a voltage comparator to compare the voltage on the LV bus 210 with a reference voltage. The control logic 140 determines that the voltage on the LV bus 210 is healthy if the voltage on the LV bus 210 is at least at the level of the reference level.

At block 310, in response to a determination that the voltage on the LV bus 210 is healthy, the control logic 140 sends a signal, via the inverter gate 230, to the AC-DC controller 144 to disable the AC-DC controller 144 (i.e., to disable control of current in the second primary winding 150).

At block 314, the control logic 140 also sends a signal to the DC-DC controller 142 to enable the DC-DC controller 142 (i.e., to enable control of current in the first primary winding 148). According to one embodiment, the signal sent by the control logic 140 to the DC-DC controller 142 is delayed by the delay circuit 232. The delay circuit 232 introduces a delay 312 to create a dead band during which both controllers 142, 144 are disabled. This dead band ensures that only one controller 142, 144 is enabled at any one time.

At block 316, the DC-DC flyback controller 142 is enabled and the FET 252 is operated (i.e., turned on and off) by the controller 142 to control the current from the LV bus 210 (generated by the battery charger 126/battery 134) through the first primary winding 148, the charging of the transformer 146, and the current through the secondary windings 152, as discussed above, to generate the output voltages.

At block 317, the control logic 140 determines if the voltage on the LV bus 210, generated by the battery charger 126 and/or battery 134 via the FET 204, is still healthy. In response to a determination that the voltage on the LV bus 210 is still healthy (i.e., the voltage on the LV bus 210 is at least at the level of the reference voltage), at block 316 the DC-DC controller 142 remains enabled and the LPS system 102 continues to run on power provided by the battery charger 126/battery 134.

In response to a determination that the voltage on the LV bus 210 is no longer healthy (i.e., the voltage on the LV bus 210 is no longer at the level of the reference voltage due to a failed or removed battery 134 and/or battery charger 126), at block 318 the control logic 140 sends a signal to the DC-DC controller 142 to disable the DC-DC controller 142. The control logic 140 may also send a signal to the DC-DC controller 142 to disable the DC-DC controller 142 at block 318 in response to a determination, at block 308, that the voltage on the LV bus 210 is not healthy after the transistor 206 and FET 204 are latched on by the push button 208 (e.g., due to the failure, removal or absence of the battery 134 and/or battery charger 126).

At block 322, the control logic 140 also sends a signal to the AC-DC controller 144, via the inverter gate 130 and the optocoupler 226, to enable the AC-DC controller 144 (i.e., to enable control of current in the second primary winding 150). According to one embodiment, the signal sent by the control logic 140 to the AC-DC controller 144 is delayed by the delay circuit 228. The delay circuit 228 introduces a delay 320 to create a "dead band" during which both controllers 142, 144 are disabled. This "dead band" ensures that only one controller 142, 144 is enabled at any one time.

At block 323, upon receiving the enablement signal from the control logic 140, the AC-DC controller 144 monitors rectified AC mains power from the rectifier 145 and determines if the rectified AC mains power is acceptable. According to one embodiment, where the AC-DC controller 144 is a TOPSwitch based flyback controller as described above, the controller 144 utilizes an internal AC OK circuit of the controller 144 to monitor the condition of the rectified AC mains power.

In response to a determination that the rectified AC mains power is not acceptable (e.g., because AC mains has failed or been disconnected from the UPS 100 or LPS system 102), at block 323 the controller 144 is not enabled (despite the enablement signal from the control logic 140) and the controller 144 continues to monitor the rectified AC mains power until the rectified AC mains power is acceptable.

In response to a determination that the rectified AC mains power is acceptable, at block 324 the AC-DC flyback controller 144 is enabled and the FET 218 is operated (i.e., turned on and off) by the controller 144 to control the current from AC mains (via the rectifier 145 and the capacitive filter 202) through the second primary winding 150, the charging of the transformer 146, and the current through the secondary windings 152, as discussed above, to generate the output voltages.

At block 325, an output voltage of the LPS system 102 on one of the output lines 154 (generated by operation of the AC/DC controller 144) is provided to the LPS ON/OFF switching logic module 202. At block 326, the output voltage received by the LPS ON/OFF switching logic module 202 from the output line 154 latches on the transistor 206 and, as a result, also latches on the FET 204. Once the FET 204 is turned on, any available power from the battery charger 126 and/or battery 134 may be provided to the LV bus 210 via the FET 204. According to one embodiment, voltage on the LV bus 210, generated by the battery charger 126/battery 134, is provided directly to the LPS ON/OFF switching logic module 202 to maintain the transistor 206 and FET 204 in an "on" or latched state.

At block 328, the control logic 140 determines if voltage on the LV bus 210, generated by the battery charger 126/ battery 134 via the FET 204, is healthy (i.e., at least at the level of the reference voltage). In response to a determination that the voltage on the LV bus 210 is not healthy (e.g., due to the failure, removal or absence of the battery 134 and/or battery charger 126), at block 324 the AC-DC controller 144 remains enabled and the LPS system 102 continues to run on power provided by AC mains 200.

In response to a determination that the voltage on the LV bus 210 is healthy (e.g., in response to the addition of a healthy battery 134 and/or battery charger 126), at block 310 the control logic 140 sends a signal to the AC-DC controller 144 to disable the AC-DC controller 144, and at block 314 sends a signal to the DC-DC controller 142 to enable the DC-DC controller 142, as described above.

According to another embodiment, a user may boot up the LPS system 102 by connecting AC mains 200 to the LPS system 102. For example, FIG. 4 is a flow chart 300 illustrating an "AC wakeup" process for operation of the LPS system 102. At block 402, the LPS system 102 is "cold" (i.e., unpowered). At block 404, a user of the UPS 100 connects AC mains 200 to the UPS 100 (and hence the LPS system 102). For example, according to one embodiment, the user of the UPS 100 connects AC mains 200 to the UPS (and hence the LPS system 102) with a cable.

Upon being coupled to the LPS system 102, AC power from AC mains 200 is rectified with the rectifier 145 and filtered with the capacitive filter 202. At block 406, the AC-DC controller 144 monitors the rectified AC mains power from the rectifier 145 and determines if the rectified AC mains power is acceptable. According to one embodiment, where the AC-DC controller 144 is a TOPSwitch based flyback controller as described above, the controller 144 utilizes an internal AC OK circuit of the controller 144 to monitor the condition of the rectified AC mains power.

In response to a determination that the rectified AC mains power is not acceptable, at block 406 the controller 144 continues to monitor the rectified AC mains power. In response to a determination that the rectified AC mains power is acceptable, at block 408 the AC-DC controller is enabled for control of current through the second primary winding 150.

At block 410, the AC-DC flyback controller 144 is enabled and the FET 218 is operated (i.e., turned on and off) by the controller 144 to control the current from AC mains (via the rectifier 145 and the capacitive filter 202) through the second primary winding 150, the charging of the transformer 146, and the current through the secondary windings 152, as discussed above, to generate the output voltages.

At block 412, an output voltage of the LPS system 102 on one of the output lines 154 (generated by operation of the AC/DC controller 144) is provided to the LPS ON/OFF switching logic module 202. At block 414, the output voltage received by the LPS ON/OFF switching logic module 202 from the output line 154 latches on the transistor 206 and, as a result, also latches on the FET 204. Once the FET 204 is turned on, any available power from the battery charger 126 and/or battery 134 may be provided to the LV bus 210 via the FET 204. According to one embodiment, voltage on the LV bus 210, generated by the battery charger 126/battery 134, is provided directly to the LPS ON/OFF switching logic module 202 to maintain the transistor 206 and FET 204 in an "on" or latched state.

At block 416, the control logic 140 determines if voltage on the LV bus 210, generated by the battery charger 126/ battery 134 via the FET 204, is healthy (i.e., at least at the level of the reference voltage). In response to a determination that the voltage on the LV bus 210 is not healthy (e.g., due to the failure, removal or absence of the battery 134 and/or battery charger 126), at block 410 the AC-DC controller 144 remains enabled and the LPS system 102 continues to run on power provided by AC mains 200.

At block 418, in response to a determination that the voltage on the LV bus 210 is healthy (e.g., due to the addition or presence of a healthy battery 134 and/or battery charger 126), the control logic 140 sends a signal, via the inverter gate 230, to the AC-DC controller 144 to disable the AC-DC controller 144 (i.e., to disable control of current in the second primary winding 150).

At block 422, the control logic 140 also sends a signal to the DC-DC controller 142 to enable the DC-DC controller 142 (i.e., to enable control of current in the first primary winding 148). According to one embodiment, the signal sent by the control logic 140 to the DC-DC controller 142 is delayed by the delay circuit 232. The delay circuit 232 introduces a delay 420 to create a dead band during which both controllers 142, 144 are disabled. This dead band ensures that only one controller 142, 144 is enabled at any one time.

At block 424, the DC-DC flyback controller 142 is enabled and the FET 252 is operated (i.e., turned on and off) by the controller 142 to control the current from the LV bus 210 (generated by the battery charger 126/battery 134) through the first primary winding 148, the charging of the transformer 146, and the current through the secondary windings 152, as discussed above, to generate the output voltages.

At block 426, the control logic 140 determines if the voltage on the LV bus 210, generated by the battery charger 126/battery 134 via the FET 204, is still healthy. In response to a determination that the voltage on the LV bus 210 is still healthy (i.e., the voltage on the LV bus 210 is at least at the level of the reference voltage), at block 424 the DC-DC controller 142 remains enabled and the LPS system 102 continues to run on power provided by the battery charger 126/battery 134.

In response to a determination that the voltage on the LV bus 210 is no longer healthy (i.e., the voltage on the LV bus 210 is no longer at the level of the reference voltage due to a failed or removed battery 134 and/or battery charger 126), at block 428 the control logic 140 sends a signal to the DC-DC controller 142 to disable the DC-DC controller 142. At block 432, the control logic 140 also sends a signal to the AC-DC controller 144, via the inverter gate 130 and the optocoupler 226, to enable the AC-DC controller 144 (i.e., to enable control of current in the second primary winding 150). According to one embodiment, the signal sent by the control logic 140 to the AC-DC controller 144 is delayed by the delay circuit 228. The delay circuit 228 introduces a delay 430 to create a dead band during which both controllers 142, 144 are disabled. This dead band ensures that only one controller 142, 144 is enabled at any one time.

At block 434, upon receiving the enablement signal from the control logic 140, the AC-DC controller 144 monitors rectified AC mains power from the rectifier 145 and determines if the rectified AC mains power is acceptable. According to one embodiment, where the AC-DC controller 144 is a TOPSwitch based flyback controller as described above, the controller 144 utilizes an internal AC OK circuit of the controller 144 to monitor the condition of the rectified AC mains power.

In response to a determination that the rectified AC mains power is not acceptable (e.g., because AC mains has failed or been disconnected from the UPS 100 or LPS system 102), at block 434 the controller 144 is not enabled (despite the enablement signal from the control logic 140) and the controller 144b continues to monitor the rectified AC mains power until the rectified AC mains power is acceptable.

In response to a determination that the rectified AC mains power is acceptable, at block 410 the AC-DC flyback controller 144 is enabled and the FET 218 is operated (i.e., turned on and off) by the controller 144 to control the current from AC mains (via the rectifier 145 and the capacitive filter 202) through the second primary winding 150, the charging of the transformer 146, and the current through the secondary windings 152, as discussed above.

According to one embodiment, where the DC-DC controller 142 is enabled and the LPS system 102 is running on power provided by the battery charger 126 and/or battery 134, the battery 134 may be removed from the UPS 100 and as long as the voltage on the LV bus 210 provided by the battery charger 126 remains healthy, the DC-DC controller 142 will remain enabled and the LPS system 102 will run on power provided by the battery charger 126.

Similarly, according to another embodiment, where the DC-DC controller 142 is enabled and the LPS system 102 is running on power provided by the battery charger 126 and/or battery 134, the battery charger 126 may not be fully operational or may fail and as long as the voltage on the LV bus 210 provided by the battery 134 remains healthy, the DC-DC controller 142 will remain enabled and the LPS system 102 will run on power provided by the battery 134.

According to one embodiment, the AC-DC controller 144 and the DC-DC controller 142 are configured to be electrically isolated from one other. For example, isolation between the controllers 142, 144 may be achieved through the use of the optocoupler 226, output voltage feedback optocouplers 260, and feedback prevention diodes 209, 211.

According to one embodiment, the control logic 140 is also configured to receive control signals from a microcontroller or DSP via an interface 262. The control signals received via the interface 262 may force the control logic 140 to selectively enable/disable a specific controller 142, 144 (i.e., specifically select one of the primary windings 148, 148 for activation) for a specific application.

As described above, the LPS system 102 utilizes flyback converters (e.g., including flyback controllers 142, 144, a flyback transformer 146 and the diode and capacitor circuit 212) to generate desired voltage outputs from AC mains and the battery charger 126/battery 134; however, in other embodiments, other types of converters may be utilized to generate the desired voltage outputs from AC mains and the battery charger 126/battery 134.

Also, as described above, the LPS system 102 provides required bias power to different subsystems (e.g., a Digital Signal Processor (DSP), microcontroller, control and communication systems, gate driver, etc) of an Uninterruptible Power Supply (UPS); however, in other embodiments, the LPS system 102 may be utilized in other systems in which bias or supply power is required.

Accordingly, embodiments described herein provide a single-transformer based LPS system and control scheme that is more efficient, smaller, and less costly than traditional LPS systems. By processing the power from two different input sources one at a time, with a single transformer, the LPS system may be more efficient and compact (i.e., take up less space on a Printed Circuit Board (PCB)) than typical dual-transformer LPS systems.

Having thus described several aspects of at least one embodiment of this invention, it is to be appreciated various alterations, modifications, and improvements will readily occur to those skilled in the art. Such alterations, modifica- tions, and improvements are intended to be part of this disclosure, and are intended to be within the spirit and scope of the invention. Accordingly, the foregoing description and drawings are by way of example only.

What is claimed is:

1. An Uninterruptible Power Supply (UPS) system, the UPS comprising:
    a transformer including:
        a first primary winding configured to be coupled to a DC power source;
        a second primary winding configured to be coupled to an AC power source; and
        at least one secondary winding;
    control logic coupled to the first primary winding and the second primary winding; and
    at least one output line coupled to the at least one secondary winding,
    wherein the control logic is configured, in a first mode of operation, to enable the first primary winding to generate, based on power received from the DC power source, a first output voltage at the at least one output line, and to disable the second primary winding, and
    wherein the control logic is configured, in a second mode of operation, to enable the second primary winding to generate, based on power received from the AC power source, a second output voltage at the at least one output line, and to disable the first primary winding.

2. The UPS system of claim 1, further comprising:
    a DC-DC controller coupled to the first primary winding; and
    an AC-DC controller coupled to the second primary winding;
    wherein, in the first mode of operation, the DC-DC controller is configured to selectively control current from the DC power source through the first primary winding to induce a first current in the at least one secondary winding, the first current in the at least one secondary winding generating the first output voltage on the at least one output line, and
    wherein, in the second mode of operation, the AC-DC controller is configured to selectively control current from the AC power source through the second primary winding to induce a second current in the at least one secondary winding, the second current in the at least one secondary winding generating the second output voltage on the at least one output line.

3. The UPS system of claim 2, wherein the DC-DC controller comprises a switch coupled to the first primary winding and configured to selectively control the current from the DC power source through the first primary winding.

4. The UPS system of claim 2, wherein the AC-DC controller comprises a switch coupled to the second primary winding and configured to selectively control the current from the AC power source through the second primary winding.

5. The UPS system of claim 2, wherein the at least one secondary winding of the transformer has a polarity opposite that of the first and second primary windings.

6. The UPS system of claim 2, wherein the DC-DC controller is coupled to the at least one output line via a feedback line, and wherein the DC-DC controller is further configured to selectively control current from the DC power source through the first primary winding based on the first output voltage on the at least one output line.

7. The UPS system of claim 2, wherein the AC-DC controller is coupled to the at least one output line via a feedback line, and wherein the AC-DC controller is further configured to selectively control current from the AC power source through the second primary winding based on the second output voltage on the at least one output line.

8. The UPS system of claim 2, further comprising:
    a bus configured to be coupled between the DC power source and the first primary winding and to the control logic;
    wherein the control logic is further configured to monitor a DC voltage on the bus provided by the DC power source and, in response to a determination that the DC voltage on the bus is at least at a threshold level, to drive the UPS system into the first mode of operation.

9. The UPS system of claim 8, wherein in response to a determination that the DC voltage on the bus is not at least at a threshold level, the control logic is further configured to drive the UPS system into the second mode of operation.

10. The UPS system of claim 9, wherein, in the second mode of operation, the AC-DC controller is further configured to monitor AC power provided by the AC power source and, in response to a determination that the AC power is acceptable, to selectively control the current from the AC power source through the second primary winding.

11. The UPS system of claim 9, further comprising:
    a switch configured to selectively couple the bus to the DC power source; and
    a selection logic module coupled to the at least one output line, the switch and the bus;
    wherein the selection logic module is configured to operate the switch to couple the bus to the DC power source in response to receiving the second output voltage on the at least one output line in the second mode of operation.

12. The UPS system of claim 11, further comprising:
    a push button coupled to the selection logic module,
    wherein the selection logic module is configured to operate the switch to couple the bus to the DC power source in response to a user pressing the push button.

13. The UPS system of claim 2, wherein the DC-DC controller is electrically isolated from the AC-DC controller.

14. The UPS system of claim 1, wherein the AC power source is an AC mains supply coupled to an Uninterruptible Power Supply (UPS), and wherein the DC power source is at least one of a battery and a battery charger within the UPS.

15. A method for providing DC power with an UPS system comprising a transformer including a first primary winding configured to be coupled to a DC power source, a second primary winding configured to be coupled to an AC power source, and at least one secondary winding coupled to an output line, the method comprising:
    monitoring, with control logic coupled to the DC power source, voltage provided by the DC power source to the first primary winding;
    comparing, in response to monitoring, the voltage provided by the DC power source to a reference voltage;
    determining, in response to comparing, whether a level of the voltage provided by the DC power source is at least equal to the reference voltage;
    in response to determining that the level of the voltage provided by the DC power source is at least equal to the reference voltage, transmitting a signal to a first controller coupled to the first primary winding to enable the first controller, and transmitting a signal to a second controller coupled to the second primary winding to disable the second controller; and
    operating, in response to enabling the first controller, the first controller to control current from the DC power source through the first primary winding to induce a first current in the at least one secondary winding, the first current in the at least one secondary winding generating a first output voltage on the output line.

16. The method of claim 15, further comprising:
in response to determining that the level of the voltage provided by the DC power source is not at least equal to the reference voltage, transmitting a signal to the first controller coupled to the first primary winding to disable the first controller, and transmitting a signal to the second controller coupled to the second primary winding to enable the second controller;
in response to enabling the second controller, monitoring, with the second controller, AC power provided by the AC power source;
determining, in response to monitoring, whether the AC power provided by the AC power source is acceptable; and
operating, in response to determining that the AC power provided by the AC power source is acceptable, the second controller to control current from the AC power source through the second primary winding to induce a second current in the at least one secondary winding, the second current in the at least one secondary winding generating a second output voltage on the output line.

17. The method of claim 16, further comprising delaying the signal transmitted to the second controller to enable the second controller.

18. The method of claim 16, wherein the UPS system further comprises a switch configured to selectively couple the first primary winding to the DC power source, and wherein the method further comprises:

closing, in response to receiving the second output voltage from the output line, the switch to couple the first primary winding to the DC power source.

19. The method of claim 15, further comprising:
monitoring, with the second controller, AC power provided by the AC power source;
determining, in response to monitoring, whether the AC power provided by the AC power source is acceptable; and
operating, in response to determining that the AC power provided by the AC power source is acceptable, the second controller to control current from the AC power source through the second primary winding to induce a second current in the at least one secondary winding, the second current in the at least one secondary winding generating a second output voltage on the output line.

20. An Uninterruptible Power Supply (UPS), the UPS comprising:
an input configured to be coupled to an AC mains supply;
a converter coupled to the input;
an inverter coupled to the converter with a DC bus;
a DC power source coupled to the DC bus;
a transformer coupled to the AC mains supply and the DC power source; and
means for selecting one of the AC mains supply and the DC power source at a time to provide power to the transformer and for generating a plurality of desired DC voltages with the transformer based on the power received from the selected one of the AC mains supply and the DC power source.

* * * * *